United States Patent
Maria

(10) Patent No.: US 9,596,226 B2
(45) Date of Patent: Mar. 14, 2017

(54) CARRIER NETWORK SECURITY INTERFACE FOR FIELDED DEVICES

(71) Applicant: AT&T Mobility II LLC, Atlanta, GA (US)

(72) Inventor: Arturo Maria, Bellevue, WA (US)

(73) Assignee: AT&T MOBILITY II LLC, Atlanta, GA (US)

( * ) Notice: Subject to any disclaimer, the term of this patent is extended or adjusted under 35 U.S.C. 154(b) by 0 days.

(21) Appl. No.: 14/989,780

(22) Filed: Jan. 6, 2016

(65) Prior Publication Data

US 2016/0119311 A1 Apr. 28, 2016

Related U.S. Application Data

(63) Continuation of application No. 13/105,836, filed on May 11, 2011, now Pat. No. 9,270,653.

(51) Int. Cl.
*H04L 29/06* (2006.01)
*H04L 12/14* (2006.01)
(Continued)

(52) U.S. Cl.
CPC .............. *H04L 63/08* (2013.01); *H04L 12/14* (2013.01); *H04L 12/1403* (2013.01);
(Continued)

(58) Field of Classification Search
CPC .............. H04L 63/0442; H04L 63/062; H04L 63/0869; H04L 12/14; H04L 12/1403; H04W 12/06
See application file for complete search history.

(56) References Cited

U.S. PATENT DOCUMENTS 6,308,203 B1 * 10/2001 Itabashi ............ G06F 17/30867
707/999.01
7,653,200 B2 * 1/2010 Karmi ................. H04L 12/5692
380/270

(Continued)

OTHER PUBLICATIONS

Non-Final Office Action dated Nov. 13, 2012 for U.S. Appl. No. 13/105,836, 15 pgs.

(Continued)

*Primary Examiner* — James Turchen
(74) *Attorney, Agent, or Firm* — Amin, Turocy & Watson, LLP

(57) ABSTRACT

Carrier-side security services for fielded devices is disclosed. In contrast to conventional authentication systems for fielded devices, wherein an end-to-end communications pathway is typically established for authentication of a fielded device by a back-end service provider, authentication and security services can be moved into devices associated with a carrier network. A device associated with the carrier network can authenticate field components to service components without first establishing a communications pathway to a back-end service provider. Further, the device can provide for secured communications with an authenticated field component and are not readable by carrier devices. In an aspect, this can allow for centralization of security elements from the periphery of back-end service providers into a device associated with the carrier network. In a further aspect, the device can host a security services platform for back-end service providers.

20 Claims, 10 Drawing Sheets

(51) Int. Cl.
*H04W 12/08* (2009.01)
*H04L 12/06* (2006.01)

(52) U.S. Cl.
CPC ...... *H04L 63/0428* (2013.01); *H04L 63/0442* (2013.01); *H04L 63/062* (2013.01); *H04L 63/0869* (2013.01); *H04L 63/105* (2013.01); *H04L 63/20* (2013.01); *H04W 12/08* (2013.01); *H04L 12/06* (2013.01)

(56) References Cited

U.S. PATENT DOCUMENTS

| | | | | |
|---|---|---|---|---|
| 7,949,329 | B2* | 5/2011 | Benco | H04W 12/12 455/410 |
| 8,028,329 | B2* | 9/2011 | Whitcomb | G06F 21/33 726/5 |
| 8,064,909 | B2* | 11/2011 | Spinelli | H04W 36/36 455/436 |
| 8,224,308 | B1* | 7/2012 | Gavrylyako | H04L 67/306 455/405 |
| 8,254,915 | B2* | 8/2012 | Kozisek | H04W 12/08 455/410 |
| 8,315,198 | B2* | 11/2012 | Corneille | G06F 8/61 340/7.2 |
| 8,412,387 | B2* | 4/2013 | Park | G06Q 50/06 307/118 |
| 8,520,615 | B2* | 8/2013 | Mehta | H04W 8/082 370/329 |
| 8,578,057 | B2* | 11/2013 | Omar | G06F 17/30905 709/203 |
| 8,601,569 | B2* | 12/2013 | Segre | H04L 63/162 726/15 |
| 8,607,309 | B2* | 12/2013 | Ropolyi | H04W 48/16 380/247 |
| 8,688,970 | B2* | 4/2014 | Bachmann | H04L 63/0428 713/151 |
| 2002/0018456 | A1* | 2/2002 | Kakemizu | H04L 12/4675 370/338 |
| 2002/0107985 | A1* | 8/2002 | Hwang | G06F 17/30905 709/246 |
| 2002/0138635 | A1* | 9/2002 | Redlich | H04L 12/2856 709/229 |
| 2003/0159072 | A1* | 8/2003 | Bellinger | H04L 63/0272 726/8 |
| 2004/0152446 | A1* | 8/2004 | Saunders | H04L 29/12009 455/411 |
| 2006/0021004 | A1* | 1/2006 | Moran | H04L 63/08 726/2 |
| 2006/0025149 | A1* | 2/2006 | Karaoguz | H04N 21/4126 455/452.2 |
| 2006/0090067 | A1* | 4/2006 | Edmonds | H04L 63/083 713/159 |
| 2006/0271785 | A1* | 11/2006 | Holtmanns | H04L 63/06 713/171 |
| 2007/0149170 | A1* | 6/2007 | Bloebaum | H04L 63/0853 455/411 |
| 2008/0222304 | A1* | 9/2008 | Sibal | H04L 69/16 709/238 |
| 2008/0227391 | A1* | 9/2008 | Rosenberg | G06Q 20/3226 455/41.1 |
| 2008/0275819 | A1* | 11/2008 | Rifai | G06Q 20/32 705/44 |
| 2008/0318550 | A1* | 12/2008 | DeAtley | H04L 63/08 455/411 |
| 2009/0061840 | A1* | 3/2009 | Fleischman | H04L 41/0809 455/419 |
| 2009/0172802 | A1* | 7/2009 | Mosek | H04L 67/2819 726/12 |
| 2009/0235069 | A1* | 9/2009 | Sonnega | H04L 63/062 713/156 |
| 2009/0254993 | A1* | 10/2009 | Leone | G06F 21/51 726/25 |
| 2010/0115598 | A1* | 5/2010 | Barriga | H04W 12/06 726/8 |
| 2010/0312692 | A1* | 12/2010 | Teicher | G06Q 20/10 705/39 |
| 2011/0016517 | A1* | 1/2011 | Kasahara | G01D 4/002 726/7 |
| 2011/0062230 | A1* | 3/2011 | Ward, II | G06Q 20/105 235/377 |
| 2011/0213688 | A1* | 9/2011 | Santos | G06Q 30/04 705/34 |
| 2011/0271110 | A1* | 11/2011 | Ohba | H04L 9/0891 713/168 |
| 2012/0005746 | A1* | 1/2012 | Wei | H04L 63/0272 726/15 |
| 2012/0040638 | A1* | 2/2012 | Lovell, Jr. | G06Q 20/16 455/406 |
| 2012/0054098 | A1* | 3/2012 | Yu | G06Q 20/102 705/40 |
| 2012/0130891 | A1* | 5/2012 | Bogaard | G07B 15/02 705/40 |
| 2012/0284785 | A1* | 11/2012 | Salkintzis | G06F 21/43 726/7 |

OTHER PUBLICATIONS

Final OA dated May 20, 2013 for U.S. Appl. No. 13/105,836, 17 pgs.
Non-Final Office Action dated Jul. 14, 2014 for U.S. Appl. No. 13/105,836, 34 pgs.
Yun Ye, et al. ; A Secure and Reliable in-network Collaborative Communication Scheme for Advanced Metering Infrastructure in Smart Grid; Jan. 1, 2011; IEEE WCNC 2011.
Yoshihiro Ohba; Issues and Challenges in Provisioning Keys to Smart Objects; Toshiba; Mar. 2, 2011.
Notice of Allowance dated Oct. 7, 2015 for U.S. Appl. No. 13/105,836, 49 pgs.
Final Office Action dated Jan. 30, 2015 for U.S. Appl. No. 13/105,836, 34 pgs.

* cited by examiner

CARRIER NETWORK SECURITY INTERFACE FOR FIELDED DEVICES

CROSS REFERENCE TO RELATED APPLICATION

This application is a continuation of, and claims priority to U.S. patent application Ser. No. 13/105,836, filed on 11 May 2011, and entitled "CARRIER NETWORK SECURITY INTERFACE FOR FIELDED DEVICES," the entirety of which is hereby incorporated by reference herein.

TECHNICAL FIELD

The disclosed subject matter relates to carrier networks service devices with security needs and, more particularly, to providing a security interface within the carrier network for fielded devices.

BACKGROUND

Conventional fielded devices, such as smart-grid endpoints, cell phones, smartphones, vehicle computer systems, etc., currently use authentication algorithms to validate the identity of the fielded device to a carrier network, such as a wireless carrier. These authentication algorithms, while adequate for many fielded devices, are unsatisfactory for some other fielded devices. Where higher levels of authentication are desirable, conventional fielded devices can first validate to the carrier network and then can undergo a second validation to a back-end service provider outside the carrier network. For example, a smart meter can use subscriber identity module (SIM) capabilities to provide stronger authentication and encryption services with a utility. The SIM capabilities can interface with a wireless stack and firmware in order to provide an enhanced set of security services (ES3). The SIM first authenticates to a wireless carrier and then can authenticate, over the wireless carrier network, to a back-end service provider outside the wireless carrier, such as an electrical utility service component, to facilitate a secure communication link between the utility and the smart meter.

An end-to-end communications pathway and associated overhead is provided each time a fielded device authenticates with a back-end service provider. This can consume resources and be associated with a level of latency. While it is desirable to maintain an ES3 for fielded devices, reducing latency and becoming more resource efficient is also desirable. Improving efficiency over the end-to-end secondary authentication of conventional techniques can be of particular concern to carrier networks where vast numbers of fielded devices can exist, as reflected by an estimated 150 million smart meters that are expected to be deployed in the US by 2020.

The above-described deficiencies of conventional secure communication systems are merely intended to provide an overview of some of problems of current technology, and are not intended to be exhaustive. Other problems with the state of the art, and corresponding benefits of some of the various non-limiting embodiments described herein, may become further apparent upon review of the following detailed description.

DETAILED DESCRIPTION

Figure 1:
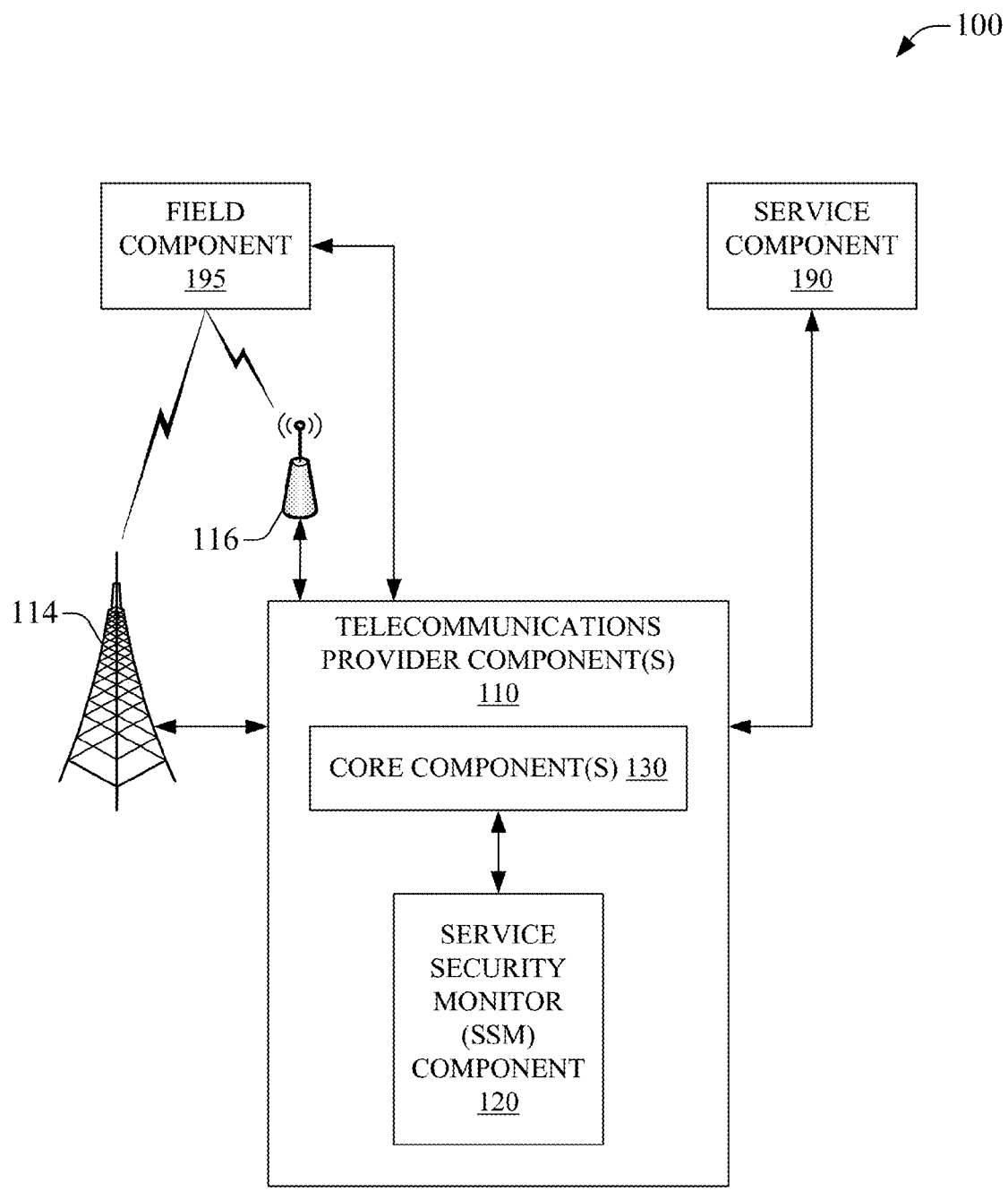
FIG. 1 is an illustration of a system that facilitates access to security services in accordance with aspects of the subject disclosure.

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

In contrast to conventional authentication systems for fielded devices, wherein an end-to-end communications pathway is typically established for authentication of a fielded device by a back-end service provider, authentication can be moved into the carrier network. This can be advantageous in that authentication can be performed without establishing an end-to-end communications pathway to a service component. Carrier networks can be provisioned with security services such that communications between a field component and a service component are authenticated by the carrier network rather than by the service component. These security services can be provided by a service security monitor (SSM) component in the carrier network.

FIG. 1 is an illustration of a system 100, which facilitates access to security services in accordance with aspects of the subject disclosure. System 100 can include telecommunications provider component(s) 110. Telecommunications provider component(s) 110 can be a telecommunications carrier network and can include core components(s) 130. Core component(s) 130 can include, for example in a General Packet Radio Service (GPRS) network, a Serving GPRS Support Node (SGSN), a Gateway GPRS Support Node (GGSN), home location register (HLR), mobile switching center (MSC), etc. As a second example, in an LTE network core components(s) 130 can include System Architecture Evolution (SAE) gateway, Mobility Management Entity (MME), public data network (PDN) gateway, HLR, etc. System 100 can further include wireless telecommunications network components such as a radio area network (RAN) 114, or access point 116. Access point 116 can be, for example, a femto-cell.

System 100 can further include service component 190 and field component 195. Service component 190 can be a component located external to the telecommunications provider component(s) 110. Further, service component 190 can be associated with providing a service to field component 195 by way of telecommunications provider component(s) 110. As a non-limiting example, service component 190 can be a server at an electrical utility that supports a field component 195, such as a smart meter, variable tap transformer, etc. As a second non-limiting example, service component 190 can be an electronic parking meter monitoring system (e.g., an electronic parking meter can be a field component 195) that supports setting parking rates on electronic parking meters, monitoring electronic parking meters for errors or service flags, etc.

Field component 195 can be included in nearly any device to facilitate a communicative coupling to service component 190 by way of telecommunications provider component(s) 110. For example, field component 195 can be a wired or wireless device, such as a cell phone, pager, smartphone, tablet computer, laptop computer, personal computer, embedded computer, vehicle computer, sensor, meter, traffic light controller, etc. Field component 195 can connect a device or system to other devices or systems to allow interactions with the device, such as control, monitoring, updating, signaling, tracking etc. For example, a smart meter (e.g., the smart meter includes field component 195) can be communicatively coupled to a utility (e.g., the utility includes a service component 190) by way of telecommunications provider component(s) 110, such as by an Ethernet cable, wireless fidelity (Wi-Fi) radio, cellular radio, etc.

In some embodiments, field component 195 can provide access to an identifier to facilitate identifying field component 195. The identifier can include nearly any type of identification information, such as a subscriber identity module (SIM) identifier, an enhanced SIM (eSIM) identifier, a Internet protocol (IP) address, a Media Access Control (MAC) address, a phone number, a password, a user id, e.g., a user identifier to log into a computer system, a website, a service, etc., a personal identification number (PIN), etc. Numerous other examples are not explicitly recited for brevity but are to be considered within the scope of the present disclosure.

Telecommunications provider component(s) 110 can include service security monitor (SSM) component 120. SSM component 120 can facilitate a security service for communication between a service component 190 and a field component 195 by way of telecommunications provider component(s) 110. A security service can include a rule or algorithm related to facilitating secure communications, digital security keys or other data related to maintaining the privacy of data in storage or being transmitted, protocols for secure communication, authentication standards, security software or applications, etc. Numerous other examples of security services are not explicitly recited herein for brevity and clarity but all such examples are to be considered within the scope of the subject disclosure. SSM component 120 can be located at a carrier network core. SSM component 120 can validate the identity of field component 195 and can facilitate secure communications with field component 195, such as by applying Advanced Encryption Standard (AES) cryptography, employing public/private key cryptography, etc.

In an aspect, where SSM component 120 is located at the core network of a telecommunications provider, authentication of field component 195 can be established prior to secure communication with service component 190. This can be in stark contrast to conventional techniques that establish an end-to-end communications path between a fielded device and a back-end service provider to provide for secondary authentication of a fielded device by the back-end service provider. As disclosed herein, authenticating a field component 195 at the core network level can occur without any communications link, or associated commitment of network resources, first needing to be established between a service component 190 and the core network. In an aspect, this can be viewed as pre-authentication of field component 195, such that field component 195 is already authenticated when service component 190 begins participating in a secure communications session with field component 195. It is to be noted that establishing an authenticated and secure communications path between field component 195 and SSM 120 facilitates secure communication with service component 190, such as by allowing encrypted communications with service component 190 to flow to and from field component 195 only after field component 195 is authenticated to SSM 120. As a non-limiting example, where field component is deployed with a digital key (e.g., from the service provider associated with a service component) the field component can establish a secure and authenticated link to SSM 120. This secure link can be employed to send encrypted messages to the field device from the service component that can then be decrypted with the digital key. The encrypted message can include additional digital keys. Further, as other field components are authenticated at SSM 120, they can also receive encrypted messages from the exemplary service component. As such, the authentication of each field component can be addressed at the carrier, rather than across the carrier with the service provider associated with the service component, which can save on network congestion, capital equipment costs, etc.

In other embodiments, SSM component 120 can receive a security service, such as a predetermined cryptography method, and can apply the security service to communications with field component 195. As a non-limiting example, a smart charging station for an electric vehicle (EV) can use an identifier provided from a field component of an EV as the EV is plugged into the charging station. The charging station can then authenticate the EV with a telecommunications provider, such as by wireless cell phone. The EV can then be authenticated to SSM component 120 and await communications from a service component 190. SSM component 120 can access a catalog of security services and, based on the identifier, apply a 256-bit cipher to communications with the EV. As such, when a communications link is established with an account provider (e.g., a service component 190) to record charges to the owner of the EV for the amount of energy consumed at the charging station, the communications can be encrypted at 256-bits. Further, this communications link can be established reliably without authenticating the EV at the service provider 190.

In an aspect, where SSM component 120 is located at the core of a carrier network, authentication can be conducted on either, or both of, layer 3 (i.e., the network layer) or layer 2 (i.e., the data link layer). This also is distinct from conventional techniques that typically employ only layer 3 for authentication because of the need to have an end-to-end communications link with a back-end service provider, which can include an internet protocol (IP) network segment. Authentication at layer 2 can be more secure than on layer 3, wherein layer 2 can be more difficult for parties external to the carrier network to access than layer 3.

In further embodiments, a SSM component 120 located at a core network can provide for authentication of large pluralities of field components at the core (e.g., a SSM component can have access to a catalog of security services, a repository for a large number of digital security keys, etc.) rather than at each of the back-end service providers. This can reduce the resource commitment typically borne by back-end service providers. As a non-limiting example, rather than having security servers and security service management providers at an electric utility, a duplicate set at an natural gas utility, and another duplicate set at a water utility, a single SSM component 120 located at a carrier's core network can provide for authentication and security for each of the electric, natural gas, and water utilities. Consolidation of security components from the back-end service providers to the core network can provide for a reduction in resources that are needed by back-end service providers to establish secure communications sessions with fielded devices as compared to conventional techniques. Moreover, the SSM can host security services for back-end service providers. As such, continuing the prior non-limiting example, each of the utilities can manage their security features in a carrier-hosted environment, minimizing or eliminating the need for any special equipment on the back-end-service-provider-side to deploy a secure communications system with their relevant field components.

Figure 2:
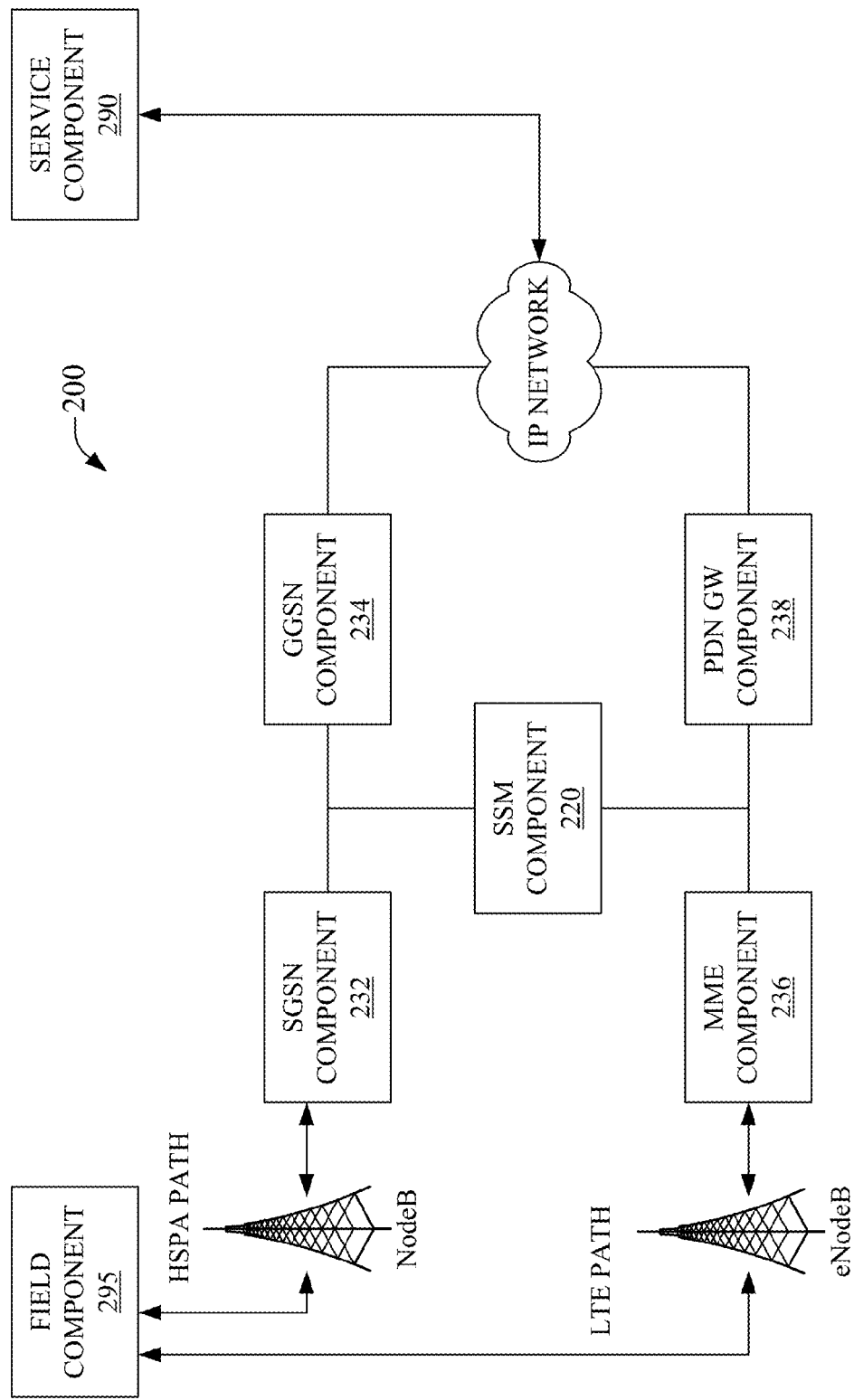
FIG. 2 is a depiction of a system that facilitates access to security services in accordance with aspects of the subject disclosure.

FIG. 2 is a depiction of a system 200 that can facilitate access to security services in accordance with aspects of the subject disclosure. System 200 can include service component 290 and field component 295. Service component 290 can be a component located external to a telecommunications provider core. Further, service component 290 can be associated with providing a service to field component 295 by way of a telecommunications provider core. Field component 295 can be included in nearly any device to facilitate a communicative coupling to service component 290 by way of a telecommunications provider core.

System 200 can include SSM component 220 that can be communicatively coupled to telecommunications provider core networks, such High Speed Packet Access (HSPA) path core network, Long Term Evolution (LTE) path core components, etc. A HSPA path core network can include Serving GPRS Support Node (SGSN) component 232 and Gateway GPRS Support Node (GGSN) component 234. In an embodiment, SSM component 220 can be communicatively coupled to a core network in a HSPA path as a front end to GGSN component 234. As such, identifiers from field component 295 can be routed to SSM component 220 for authentication and establishment of security services by SGSN component 232. It is to be noted that SSM component 220 can be located at other points in a HSPA core network.

Core network components of a LTE path can include Mobility Management Entity (MME) component 236 and public data network (PDN) gateway component 238. In an embodiment, SSM component 220 can be communicatively coupled to a core network in a LTE path between MME component 236 and PDN gateway component 238. It is to be noted that SSM component 220 can be located at other points in a LTE core network.

SSM component 220 can facilitate employing a security service for communication between a service component 290 and a field component 295 by way of a telecommunications provider. SSM component 220 can be located at a carrier network core. SSM component 220 can validate the identity of field component 295 and can facilitate secure communications with field component 295. In some embodiments, SSM component 220 can established authentication of field component 295 prior to facilitating secure communication between field component 295 and service component 290. In further embodiments, SSM component 220 can access a security service and can apply the security service to communications with field component 295. In an aspect, SSM component 220 can conduct authentication on either layer 2 or layer 3. In further embodiments, SSM component 220 can provide for authentication of numerous field components, which can reduce the resource commitment across system 200. Consolidation of security components from back-end service providers into a core network can provide for a reduction in resources that are needed by back-end service providers to establish secure communications sessions with fielded devices as compared to conventional techniques. Moreover, the SSM component 220 can host security services for back-end service providers.

Figure 3:
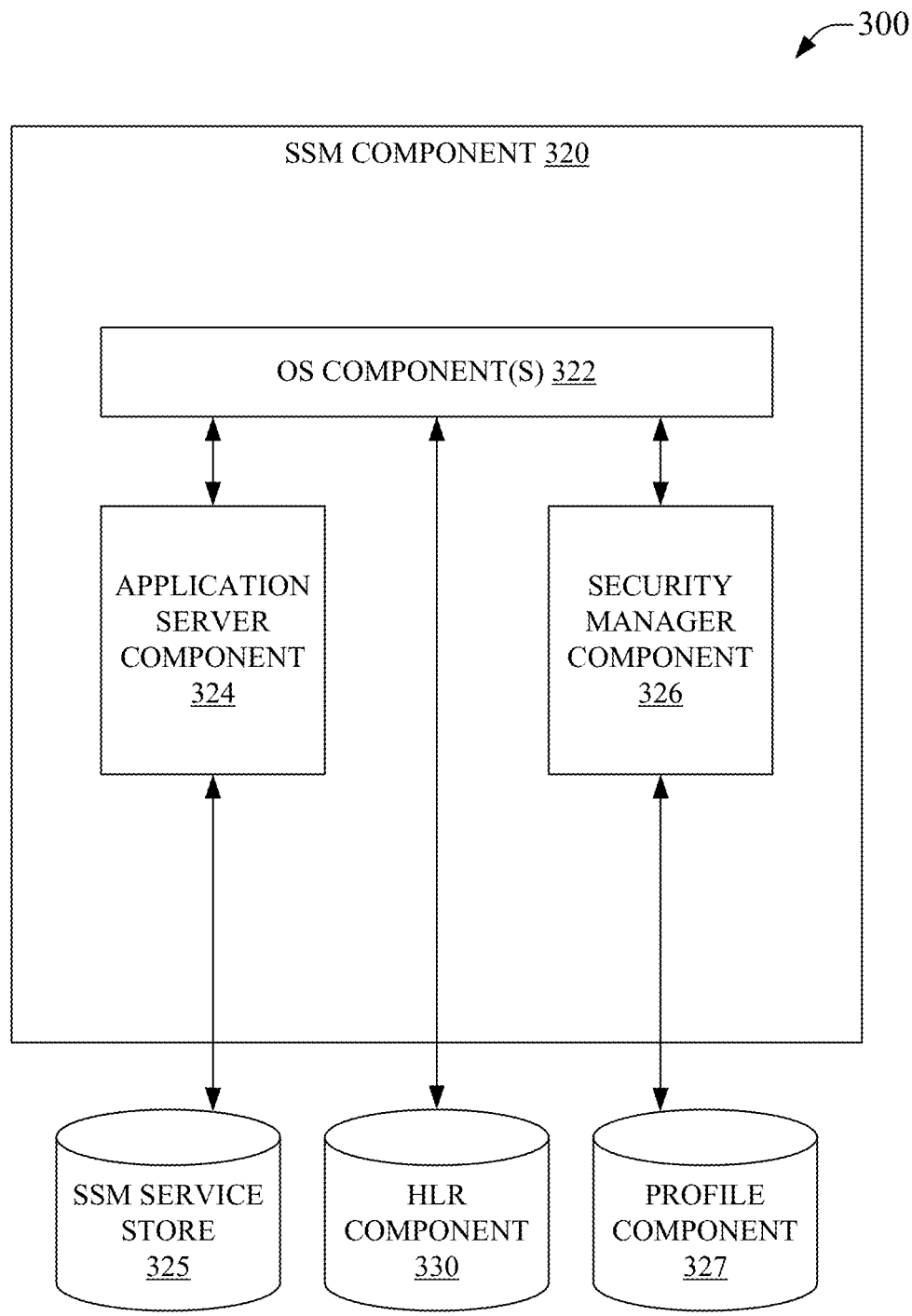
FIG. 3 illustrates a system that facilitates access to security services in accordance with the disclosed subject matter.

FIG. 3 illustrates a system 300 that facilitates access to security services in accordance with aspects of the subject disclosure. System 300 can include SSM component 320. SSM component 320 can facilitate secure communication between a service component and a field component by way of a telecommunications provider. In some embodiments, SSM component 320 can include an operating system (OS) component(s) 322. OS component 322 can receive information from home location register (HLR) component 330. HLR component 330 can facilitate access to details of entities authorized to use a core network, such as a cellular phone subscriber information, smart meter location information, parking meter identification information, etc.

In an embodiment, OS component 322 can be communicatively coupled to application server component 324. Application server component 324 can facilitate receiving one or more security services. As a non-limiting example, application server component 324 can receive a cipher for encryption and decryption of communications such that the cipher can be delivered in update to the firmware of an authenticated field component. Application server component 324 can be communicatively coupled to SSM service store 325. SSM service store 325 can be a local, remote, or distributed data store that can include stored security services. As such, application server component 324 can receive security services from SSM service store 325. As a non-limiting example, SSM service store 325 can include a catalog of security services and application server component 324 can query the catalog to access a designated security service, such as accessing the most recent authentication algorithm for an authenticated smart meter.

In further embodiments, SSM component 320 can include security manager component 326 communicative coupled to OS component(s) 322. Security manager component 326 can facilitate the selection of security services (e.g., by way of application server component 324). In an aspect, profiles for field components can be stored at profile component 327, which can be a local, remote, or distributed data store. Security manager component 326 can receive a field component profile, such as from profile component 327, to facilitate selection of a security service. As a non-limiting example, an EV charging station can transmit an identifier for a charging EV. The identifier can be employed to authenticate the EV. The identifier can further be employed by the security manager component 326 to identify a profile for the EV, such as from profile component 327. The profile for the EV can designate a security service. The identified security service from the EV profile can be employed by application server component 324 to access any relevant updates to the security applications of the charging EV, such as by searching a catalog of security service updates on SSM service store 325. Where an update is found by application server component 324, the update can be made available to the charging EV such that the EV can update the security application of the EV.

Figure 4:
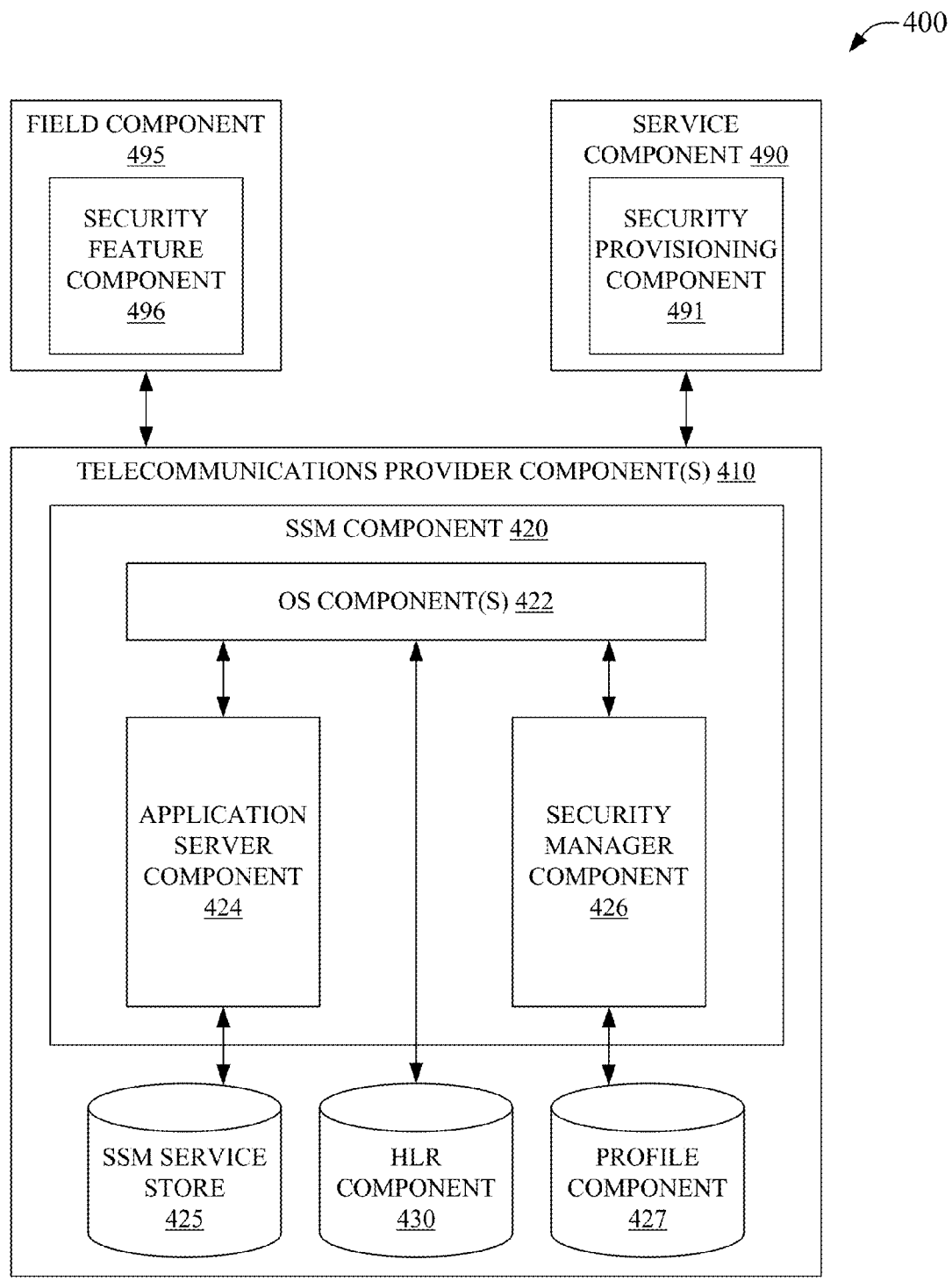
FIG. 4 is a depiction of a system that facilitates access to security services in accordance with aspects of the subject disclosure.

FIG. 4 is a depiction of a system 400 that facilitates access to security services in accordance with aspects of the subject disclosure. System 400 can include SSM component 420. SSM component 420 can facilitate secure communication between a service component 490 and a field component 495 by way of telecommunications provider components(s) 410. SSM component 420 can include an OS component(s) 422. OS component 422 can receive information from HLR component 430. HLR component 430 can facilitate access to core network user data. OS component 422 can be communicatively coupled to application server component 424. Application server component 424 can facilitate receiving one or more security services. Application server component 424 can be communicatively coupled to SSM service store 425. SSM service store 425 can include stored security services. Further, SSM component 420 can include security manager component 426. Security manager component 426 can facilitate the selection of security services. Security manager component 426 can receive a profile to facilitate selection of a security service. In some embodiments, profiles can be stored at profile component 427.

In some embodiments, system 400 can further include security feature component 496 at field component 495. Security feature component 496 can receive security services, such as security services from SSM component 420. As a non-limiting example, a smart meter (e.g., field component 495) can transmit an identifier. The identifier can be employed to authenticate the smart meter. The identifier can further be employed by the security manager component 426 to identify a profile for the smart meter, such as from profile component 427. The profile for the smart meter can designate a security service. The identified security service from the smart meter profile can be employed by application server component 424 to access a security application for the smart meter, such as by searching a catalog of security service updates on SSM service store 425. Application server component 424 can make the security application available to the smart meter (e.g., field component 495). The smart meter can include a security feature component 496 that can facilitate receiving the security application at the smart meter. As such, the security application can be added to the smart meter. Numerous other examples can be envisioned but are not enumerated herein for brevity, though all such examples are considered within the scope of the presently disclosed subject matter.

In further embodiments, service component 490 can include security provisioning component 491. Security provisioning component 491 can prepare and equip SSM component 420 to provide security services to field component 495. As a non-limiting example, security provisioning component 491 can provide a security service to application server component 424. In an aspect, application server component 424 can store the newly provisioned security service at SSM service store 425. In another aspect, application server component 424 can provide access to the newly provisioned security service to field component 495. Further, security manager component 426 can update one or more profiles to reflect provisioned security services. In some embodiments, security provisioning component 491 can provide updates to profiles or new profiles directly, such as by way of security manager component 426 for storage at profile component 427.

Figure 5:
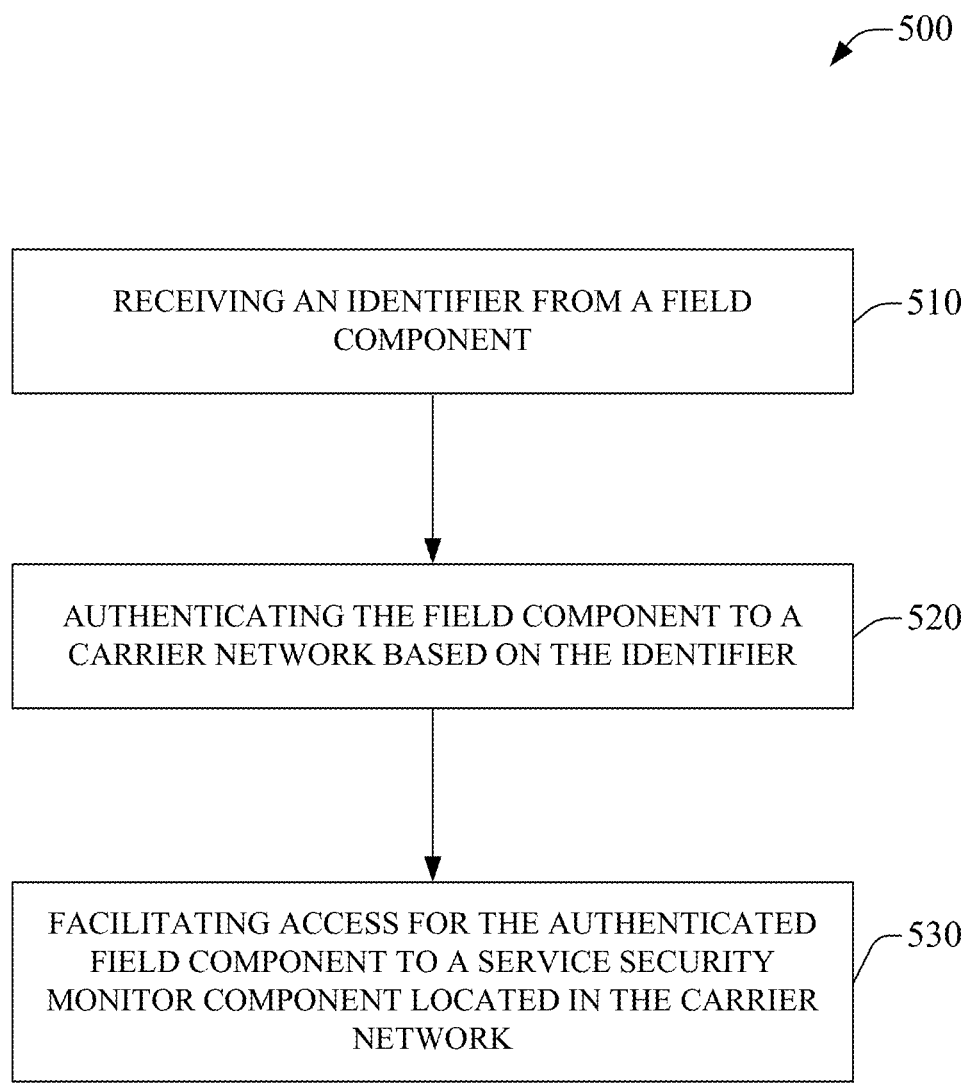
FIG. 5 illustrates aspects of a method facilitating access to security services in accordance with aspects of the subject disclosure.
Figure 6:
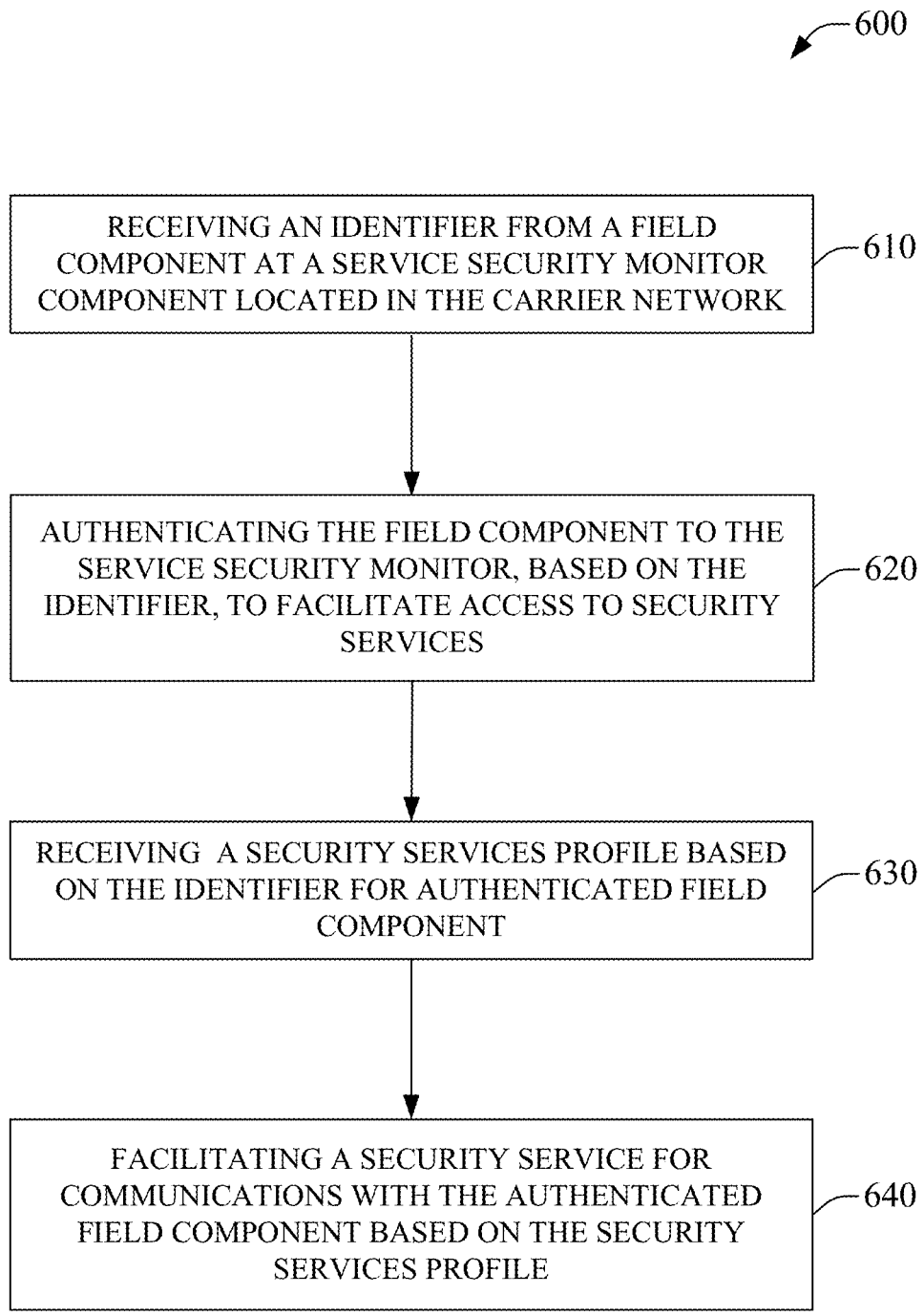
FIG. 6 illustrates aspects of a method facilitating access to security services in accordance with aspects of the subject disclosure.
Figure 7:
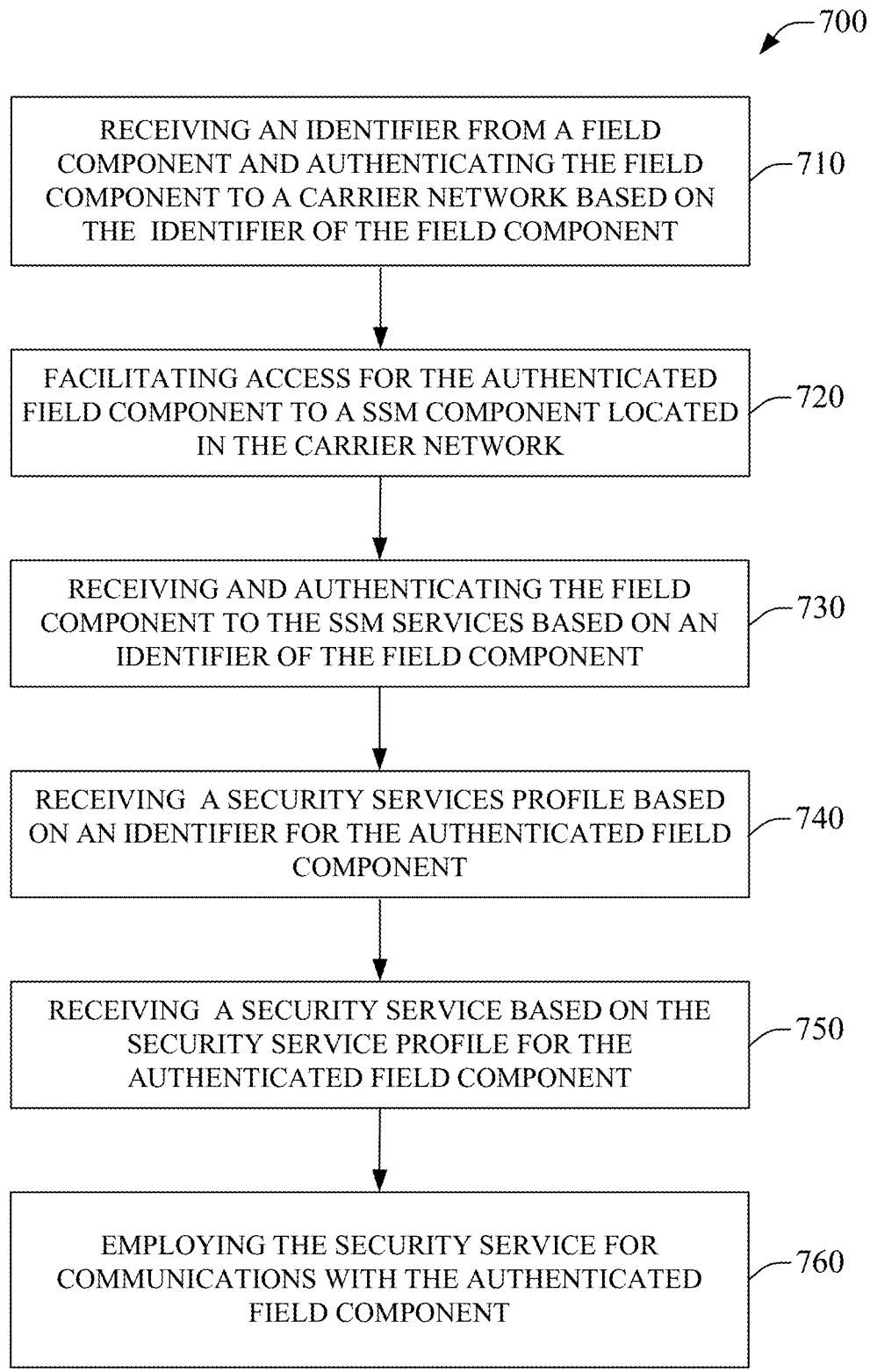
FIG. 7 illustrates a method for facilitating access to security services in accordance with aspects of the subject disclosure.

In view of the example system(s) described above, example method(s) that can be implemented in accordance with the disclosed subject matter can be better appreciated with reference to flowcharts in FIG. 5-FIG. 7. For purposes of simplicity of explanation, example methods disclosed herein are presented and described as a series of acts; however, it is to be understood and appreciated that the claimed subject matter is not limited by the order of acts, as some acts may occur in different orders and/or concurrently with other acts from that shown and described herein. For example, one or more example methods disclosed herein could alternatively be represented as a series of interrelated states or events, such as in a state diagram. Moreover, interaction diagram(s) may represent methods in accordance with the disclosed subject matter when disparate entities enact disparate portions of the methodologies. Furthermore, not all illustrated acts may be required to implement a described example method in accordance with the subject specification. Further yet, two or more of the disclosed example methods can be implemented in combination with each other, to accomplish one or more aspects herein described. It should be further appreciated that the example methods disclosed throughout the subject specification are capable of being stored on an article of manufacture (e.g., a computer-readable medium) to allow transporting and transferring such methods to computers for execution, and thus implementation, by a processor or for storage in a memory.

FIG. 5 illustrates aspects of a method 500 facilitating access to security services in accordance with aspects of the subject disclosure. At 510, method 500 can receive an identifier from a field component. The identifier can include nearly any type of identification information, such as a SIM identifier, an eSIM identifier, an IP address, MAC address, a phone number, a password, a user id, e.g., a user identifier to log into a computer system, a unique identifier, a class identifier, a model number identifier, a PIN, etc. Numerous other examples are not explicitly recited for brevity but are to be considered within the scope of the present disclosure. At 520, the identifier can be employed to authenticate the field component to a carrier network, such as a telecommunications carrier network. At 530, method 500 can facilitate access for the authenticated field component to a security service monitor (SSM) component located at, or in, the carrier network. At this point method 500 can end.

A SSM component can employ a security service for communication between a service component and the field component by way of the carrier network. The SSM component can be located at a carrier network core and can authenticate the identity of the field component. Further, the SSM component can provide a secure communications environment for the field component. In some embodiments of method 500, the SSM component can access a security service and can apply the security service to communications with the field component. A security service can include a rule or algorithm related to facilitating secure communications, digital security keys or other data related to maintaining the privacy of data in storage or being transmitted, protocols for secure communication, authentication standards, security software or applications, etc. Numerous other examples of security services are not explicitly recited herein for brevity and clarity but all such examples are to be considered within the scope of the subject disclosure.

In an aspect, method 500 can serve to authenticate a field component to a carrier network. Further, method 500 can provide access for the field component to a SSM component. The SSM component can address further, typically stronger authentication, of the field component and can apply security services in relation to communications with the field component. As a non-limiting example, automatic teller machines (ATMs), e.g., cash machines, can first be authenticated to a carrier network and then be routed to a SSM component of the carrier network. The SSM component can then strongly authenticate the ATM. Where the ATM is successfully authenticated, the SSM component can then employ one or more security services with regard to the ATM, such as the ATM can receive updates to a security digital key ring, receive a security firmware update, be queued for secure communication with a bank service component, etc. Numerous other examples, for brevity, are not included, though all should be considered within the scope of the subject disclosure.

FIG. 6 illustrates aspects of a method 600 facilitating access to security services in accordance with aspects of the subject disclosure. At 610, method 600 can receive an identifier related to a field component at a SSM component located at, or in, the carrier network. At 620, the identifier can be employed to authenticate the field component to the SSM component. In an aspect, this can be associated with authenticating the field component to access or receive certain security services by authentication to the SSM component.

At 630, method 600 can include the SSM component receiving a security services profile for the authenticated field component. The security services profile can be a profile related to the security services employed for the authenticated field component. As a non-limiting example, the security services profile for an authenticated field component can include information pertaining to currently employed ciphers, cryptosystems, digital keys (e.g., symmetric keys, public keys, etc.), a security update roadmap, new security updates that are to be applied, a list of security features, security fault information, etc.

At 640, a security service for communications with the authenticated field component can be facilitated. The security services profile can facilitate employing security services with regard to the field component. As a non-limiting example, where the security services profile includes a list of security updates, these security updates can be pushed to a field component. As a second non-limiting example, the security services profile can indicate that 128-bit AES encryption can be employed in communicating with the field component. Based on this indication, 128-bit AES encryption can be applied to all communications with the field component. At this point method 600 can end.

In an aspect, method 600 can allow for authentication to a SSM component. This can occur after the field component is authenticated to the carrier network. For example, a moderate authentication protocol can be applied to authenticate devices to a carrier network. Further, a second level of authentication to the SSM component can occur for some device. As a non-limiting example, an ATM, a smart meter, and a cell phone can quickly authenticate to a carrier network, however the ATM can then undergo a stronger authentication to the SSM than the smart meter due to the inherent levels of risk associated with inadequate security protocols for each device, while the cell phone may never be routed to the SSM for authentication where simple carrier network authentication is sufficient for communications with the cell phone. Where both the ATM and smart meter are authenticated to the SSM, though at different levels of authentication, they can have security services employed in communications with the authenticated devices according to satisfying predetermined rules. These rules can be embodied in a secure services profile for the ATM and a secure services profile for the smart meter. As such, communications with the ATM can employ different security services than those employed in communications with the smart meter.

FIG. 7 illustrates a method 700 access to security services in accordance with aspects of the subject disclosure. At 710, an identifier can be received from and employed in authenticating a field component to a carrier network. At 720, the carrier network authenticated field component can access a SSM component located in the carrier network. At 730, the SSM component can receive an identifier from the field component and authenticate the field component to the SSM component. This can include authenticating the field component to the security services provided by way of the SSM component. Where the field component is authenticated to both the carrier network and the SSM services, security services can be employed in communications with the authenticated field component. In an aspect, the identifier for authenticating to the carrier can be the same or different from the identifier to authenticate to the SSM services. As a non-limiting example, an eSIM identifier can be used to authenticate to both the carrier network and a SSM component. As a second non-limiting example, a SIM identifier can be used to authenticate to the carrier network and a class identifier can be used to authenticate to the SSM component. It can be noted in the second example, that authentication to the SSM component need not employ a unique identifier and as such, can identify membership is a class, group, etc. As an example, electronic parking meters may not need to be individually identified and can simply access security services as members of a 'parking meter class'.

At 740, method 700 can include receiving a security services profile based on an identifier for the authenticated field component. Similar to the authentication process, the identifier for receiving the security services can be the same or different from other identifier(s), such as the identifier(s) employed in authentication. As a non-limiting example, a field component can provide a first identifier to authenticate to a carrier network, a second identifier to authenticate to the SSM component, and a third identifier can be employed to receive a security services profile. As a second non-limiting example, an eSIM identifier can be employed to authenticate to the carrier network, the SSM component, and to access a security services profile. At 750, a security service can be received based on the security services profile. At 760, the received security serve can be employed in communications with the authenticated field component. At this point, method 700 can end.

Figure 8:
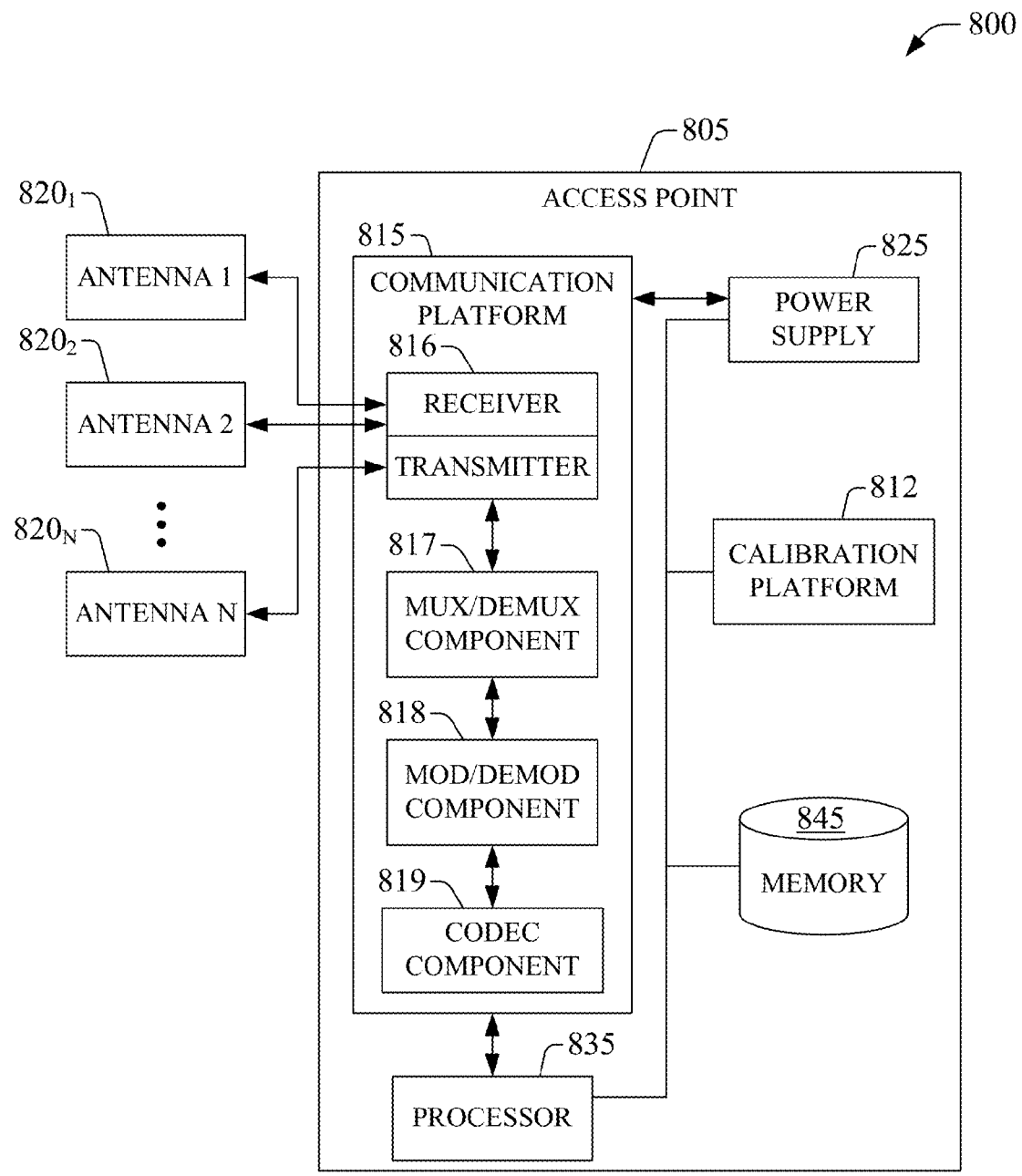
FIG. 8 illustrates a block diagram of an exemplary embodiment of an access point to implement and exploit one or more features or aspects of the subject disclosure.

FIG. 8 illustrates a block diagram of an example embodiment of an access point to implement and exploit one or more features or aspects of the subject innovation. Access point 800 can be part of a communications framework, for example, a femto-cell (e.g., 116), a microcell, a picocell, a router, a wireless router, etc. In embodiment 800, AP 805 can receive and transmit signal(s) (e.g., attachment signaling) from and to wireless devices like femto-cell access points, access terminals, wireless ports and routers, or the like, through a set of antennas $820_1$-$820_N$ (N is a positive integer). It can be noted that antennas $820_1$-$820_N$ can be part of communication platform 815, which comprises electronic components and associated circuitry that provides for processing and manipulation of received electromagnetic signal(s) and electromagnetic signal(s) to be transmitted.

Such electronic components and circuitry embody, at least in part, can comprise signaling and traffic components within a communication framework. In some embodiments, communication platform 815 can include a receiver/transmitter 816 that can convert signal from analog to digital upon reception, and from digital to analog upon transmission. In addition, receiver/transmitter 816 can divide a single data stream into multiple, parallel data streams, or perform the reciprocal operation. Coupled to receiver/transmitter 816 is a multiplexer/demultiplexer 817 that facilitates manipulation of signal in time and frequency space. Electronic component 817 can multiplex information (data/traffic and control/signaling) according to various multiplexing schemes such as time division multiplexing (TDM), frequency division multiplexing (FDM), orthogonal frequency division multiplexing (OFDM), code division multiplexing (CDM), space division multiplexing (SDM). In addition, mux/demux component 817 can scramble and spread information (e.g., codes) according to substantially any code known in the art; e.g., Hadamard-Walsh codes, Baker codes, Kasami codes, polyphase codes, and so on. A modulator/demodulator 818 is also a part of communication platform 815, and can modulate information according to multiple modulation techniques, such as frequency modulation, amplitude modulation (e.g., M-ary quadrature amplitude modulation (QAM), with M a positive integer), phase-shift keying (PSK), and the like. Communication platform 815 also includes a coder/decoder (codec) component 819 that facilitates decoding received signal(s), and coding signal(s) to convey.

Access point 805 can also include a processor 835 configured to confer functionality, at least in part, to substantially any electronic component in AP 805. Power supply 825 can attach to a power grid and include one or more transformers to achieve a power level that can operate AP 805 components and circuitry. Additionally, power supply 825 can include a rechargeable power component to ensure operation when AP 805 is disconnected from the power grid, or in instances, the power grid is not operating.

Processor 835 also is functionally connected to communication platform 815 and can facilitate operations on data (e.g., symbols, bits, or chips) for multiplexing/demultiplexing, such as effecting direct and inverse fast Fourier transforms, selection of modulation rates, selection of data packet formats, inter-packet times, etc. Moreover, processor 835 is functionally connected, via a data or system bus, to calibration platform 812 and other components (not shown) to confer, at least in part functionality to each of such components.

In AP 805, memory 845 can store data structures, code instructions and program modules, system or device information, code sequences for scrambling, spreading and pilot transmission, location intelligence storage, determined delay offset(s), over-the-air propagation models, and so on. Processor 835 is coupled to the memory 845 in order to store and retrieve information necessary to operate and/or confer functionality to communication platform 815, calibration platform 812, and other components (not shown) of access point 805.

Figure 9:
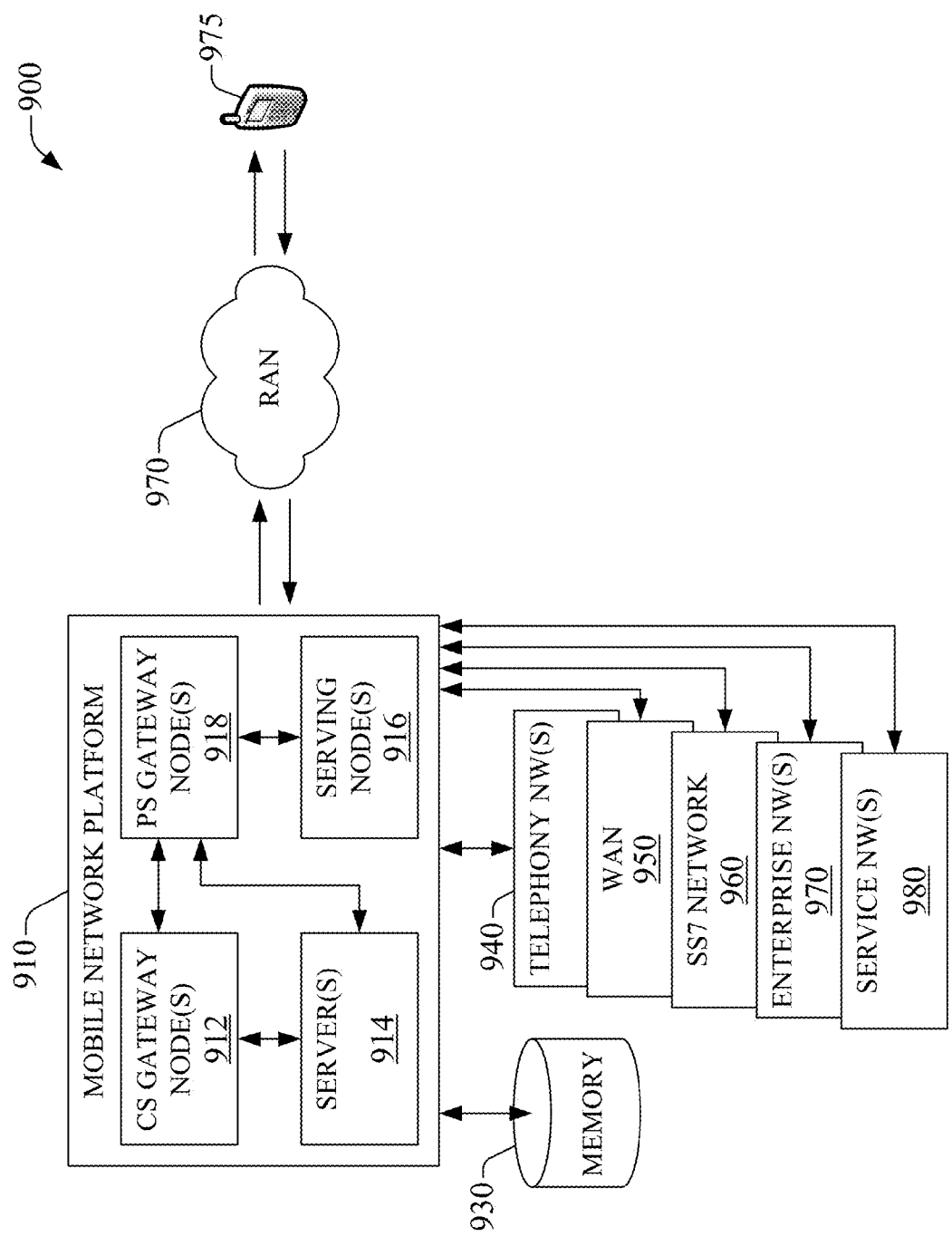
FIG. 9 is a block diagram of an exemplary embodiment of a mobile network platform to implement and exploit various features or aspects of the subject disclosure.

FIG. 9 presents an example embodiment 900 of a mobile network platform 910 that can implement and exploit one or more aspects of the subject innovation described herein. Generally, wireless network platform 910 can include components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, wireless network platform 910 can be included in telecommunications provider component(s) 110, 410, etc. Mobile network platform 910 includes CS gateway node(s) 912 which can interface CS traffic received from legacy networks like telephony network(s) 940 (e.g., public switched telephone network (PSTN), or public land mobile network (PLMN)) or a signaling system #7 (SS7) network 970. Circuit switched gateway node(s) 912 can authorize and authenticate traffic (e.g., voice) arising from such networks. Additionally, CS gateway node(s) 912 can access mobility, or roaming, data generated through SS7 network 970; for instance, mobility data stored in a visited location register (VLR), which can reside in memory 930. Moreover, CS gateway node(s) 912 interfaces CS-based traffic and signaling and PS gateway node(s) 918. As an example, in a 3GPP UMTS network, CS gateway node(s) 912 can be realized at least in part in gateway GPRS support node(s) (GGSN). It should be appreciated that functionality and specific operation of CS gateway node(s) 912, PS gateway node(s) 918, and serving node(s) 916, is provided and dictated by radio technology(ies) utilized by mobile network platform 910 for telecommunication.

In addition to receiving and processing CS-switched traffic and signaling, PS gateway node(s) 918 can authorize and authenticate PS-based data sessions with served mobile devices. Data sessions can include traffic, or content(s), exchanged with networks external to the wireless network platform 910, like wide area network(s) (WANs) 950, enterprise network(s) 970, and service network(s) 980, which can be embodied in local area network(s) (LANs), can also be interfaced with mobile network platform 910 through PS gateway node(s) 918. It is to be noted that WANs 950 and enterprise network(s) 960 can embody, at least in part, a service network(s) like IP multimedia subsystem (IMS). Based on radio technology layer(s) available in technology resource(s) 917, packet-switched gateway node(s) 918 can generate packet data protocol contexts when a data session is established; other data structures that facilitate routing of packetized data also can be generated. To that end, in an aspect, PS gateway node(s) 918 can include a tunnel interface (e.g., tunnel termination gateway (TTG) in 3GPP UMTS network(s) (not shown)) which can facilitate packetized communication with disparate wireless network(s), such as Wi-Fi networks.

In embodiment 900, wireless network platform 910 also includes serving node(s) 916 that, based upon available radio technology layer(s) within technology resource(s) 917, convey the various packetized flows of data streams received through PS gateway node(s) 918. It is to be noted that for technology resource(s) 917 that rely primarily on CS communication, server node(s) can deliver traffic without reliance on PS gateway node(s) 918; for example, server node(s) can embody at least in part a mobile switching center. As an example, in a 3GPP UMTS network, serving node(s) 916 can be embodied in serving GPRS support node(s) (SGSN).

For radio technologies that exploit packetized communication, server(s) 914 in wireless network platform 910 can execute numerous applications that can generate multiple disparate packetized data streams or flows, and manage (e.g., schedule, queue, format . . . ) such flows. Such application(s) can include add-on features to standard services (for example, provisioning, billing, customer support . . . ) provided by wireless network platform 910. Data streams (e.g., content(s) that are part of a voice call or data session) can be conveyed to PS gateway node(s) 918 for authorization/authentication and initiation of a data session, and to serving node(s) 916 for communication thereafter. In addition to application server, server(s) 914 can include utility server(s), a utility server can include a provisioning server, an operations and maintenance server, a security server that can implement at least in part a certificate authority and firewalls as well as other security mechanisms, and the like. In an aspect, security server(s) secure communication served through wireless network platform 910 to ensure network's operation and data integrity in addition to authorization and authentication procedures that CS gateway node(s) 912 and PS gateway node(s) 918 can enact. Moreover, provisioning server(s) can provision services from external network(s) like networks operated by a disparate service provider; for instance, WAN 950 or Global Positioning System (GPS) network(s) (not shown). Provisioning server(s) can also provision coverage through networks associated to wireless network platform 910 (e.g., deployed and operated by the same service provider), such as femto-cell network(s) (not shown) that enhance wireless service coverage within indoor confined spaces and offload RAN resources in order to enhance subscriber service experience within a home or business environment.

It is to be noted that server(s) 914 can include one or more processors configured to confer at least in part the functionality of macro network platform 910. To that end, the one or more processor can execute code instructions stored in memory 930, for example. It is should be appreciated that server(s) 914 can include a content manager 915, which operates in substantially the same manner as described hereinbefore.

In example embodiment 900, memory 930 can store information related to operation of wireless network platform 910. Other operational information can include provisioning information of mobile devices served through wireless platform network 910, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 930 can also store information from at least one of telephony network(s) 940, WAN 950, enterprise network(s) 960, or SS7 network 970. In an aspect, memory 930 can be, for example, accessed as part of a data store component or as a remotely connected memory store.

Figure 10:
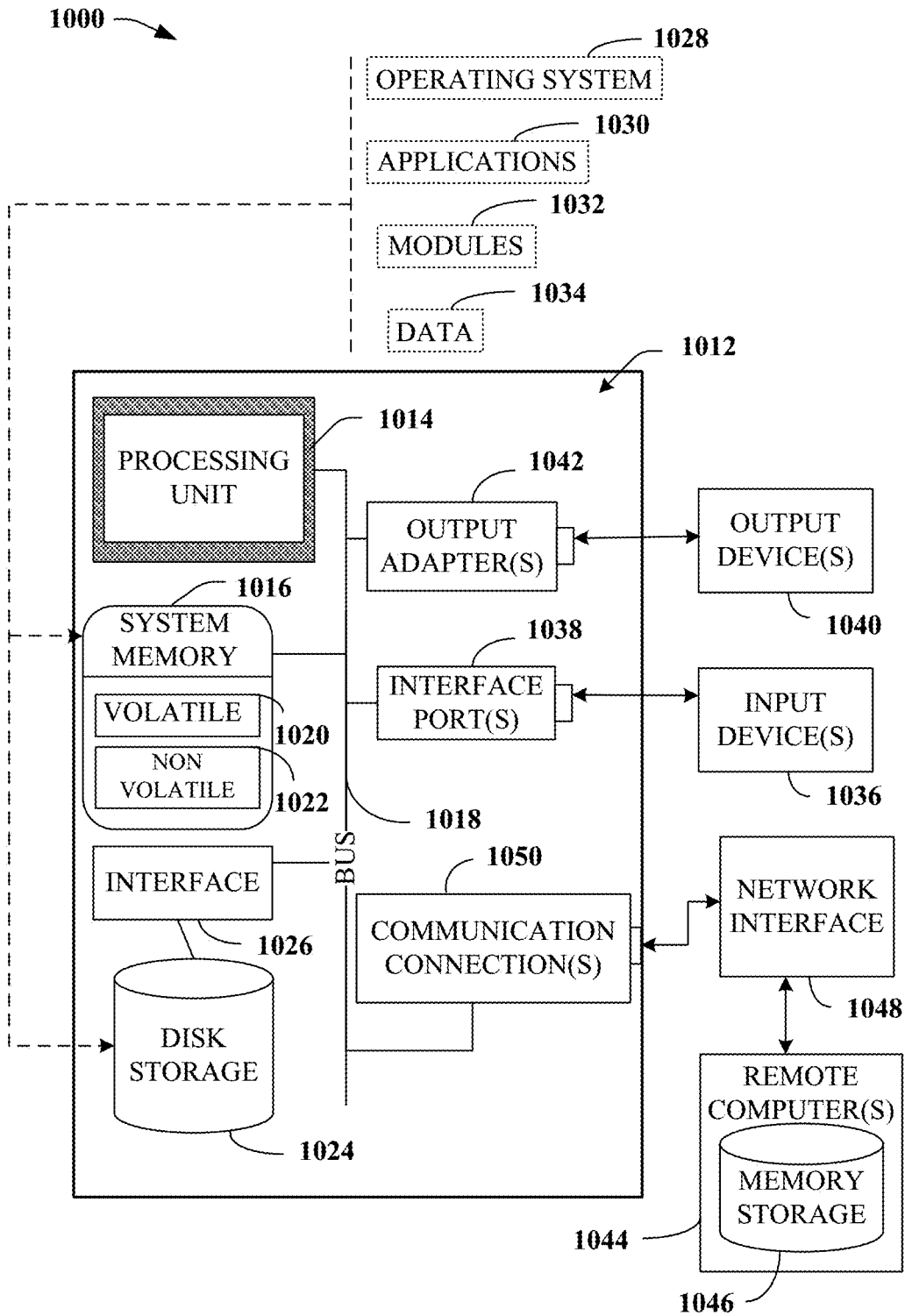
FIG. 10 illustrates a block diagram of a computing system operable to execute the disclosed systems and methods in accordance with an embodiment.

In order to provide a context for the various aspects of the disclosed subject matter, FIG. 10, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the subject innovation also can be implemented in combination with other program modules. Generally, program modules include routines, programs, components, data structures, etc. that perform particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory.

By way of illustration, and not limitation, nonvolatile memory, for example, can be included in application server component 324, 424, security manager component 326, 426, volatile memory 1020, non-volatile memory 1022 (see below), disk storage 1024 (see below), and memory storage 1046 (see below). Further, nonvolatile memory can be included in read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, those skilled in the art will appreciate that the disclosed subject matter can be practiced with other computer system configurations, including single-processor or multiprocessor computer systems, mini-computing devices, mainframe computers, as well as personal computers, hand-held computing devices (e.g., PDA, phone, watch, tablet computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 10 illustrates a block diagram of a computing system 1000 operable to execute the disclosed systems and methods in accordance with an embodiment. Computer 1012 (which can be, for example, part of the hardware of a SSM component (e.g., 120, 220, 320, 420, etc.), an field component (e.g., 195, 295, 495, etc.) a service component (e.g., 190, 290, 490, etc.), a femto-cell (e.g., 116), etc.) includes a processing unit 1014, a system memory 1016, and a system bus 1018. System bus 1018 couples system components including, but not limited to, system memory 1016 to processing unit 1014. Processing unit 1014 can be any of various available processors. Dual microprocessors and other multiprocessor architectures also can be employed as processing unit 1014.

System bus 1018 can be any of several types of bus structure(s) including a memory bus or a memory controller, a peripheral bus or an external bus, and/or a local bus using any variety of available bus architectures including, but not limited to, Industrial Standard Architecture (ISA), Micro-Channel Architecture (MSA), Extended ISA (EISA), Intelligent Drive Electronics, VESA Local Bus (VLB), Peripheral Component Interconnect (PCI), Card Bus, Universal Serial Bus (USB), Advanced Graphics Port (AGP), Personal Computer Memory Card International Association bus (PC-MCIA), Firewire (IEEE 1194), and Small Computer Systems Interface (SCSI).

System memory 1016 includes volatile memory 1020 and nonvolatile memory 1022. A basic input/output system (BIOS), containing routines to transfer information between elements within computer 1012, such as during start-up, can be stored in nonvolatile memory 1022. By way of illustration, and not limitation, nonvolatile memory 1022 can include ROM, PROM, EPROM, EEPROM, or flash memory. Volatile memory 1020 includes RAM, which acts as external cache memory. By way of illustration and not limitation, RAM is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1012 also includes removable/non-removable, volatile/non-volatile computer storage media. FIG. 10 illustrates, for example, disk storage 1024. Disk storage 1024 includes, but is not limited to, devices like a magnetic disk drive, floppy disk drive, tape drive, Jaz drive, Zip drive, LS-100 drive, flash memory card, or memory stick. In addition, disk storage 1024 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1024 to system bus 1018, a removable or non-removable interface is typically used, such as interface 1026.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

It can be noted that FIG. 10 describes software that acts as an intermediary between users and computer resources described in suitable operating environment 1000. Such software includes an operating system 1028 (e.g., OS component(s) 322, 422, etc.) Operating system 1028, which can be stored on disk storage 1024, acts to control and allocate resources of computer system 1012. System applications 1030 take advantage of the management of resources by operating system 1028 through program modules 1032 and program data 1034 stored either in system memory 1016 or on disk storage 1024. It is to be noted that the disclosed subject matter can be implemented with various operating systems or combinations of operating systems.

A user can enter commands or information into computer 1011 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1014 through system bus 1018 by way of interface port(s) 1038. Interface port(s) 1038 include, for example, a serial port, a parallel port, a game port, a universal serial bus (USB), an infrared port, a Bluetooth port, an IP port, or a logical port associated with a wireless service, etc. Output device(s) 1040 use some of the same type of ports as input device(s) 1036.

Thus, for example, a USB port can be used to provide input to computer 1012 and to output information from computer 1012 to an output device 1040. Output adapter 1042 is provided to illustrate that there are some output devices 1040 like monitors, speakers, and printers, among other output devices 1040, which use special adapters. Output adapters 1042 include, by way of illustration and not limitation, video and sound cards that provide means of connection between output device 1040 and system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. Remote computer(s) 1044 can be a personal computer, a server, a router, a network PC, a workstation, a microprocessor based appliance, a peer device, or other common network node and the like, and typically includes many or all of the elements described relative to computer 1012.

For purposes of brevity, only a memory storage device 1046 is illustrated with remote computer(s) 1044. Remote computer(s) 1044 is logically connected to computer 1012 through a network interface 1048 and then physically connected by way of communication connection 1050. Network interface 1048 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). As noted below, wireless technologies may be used in addition to or in place of the foregoing.

Communication connection(s) 1050 refer(s) to hardware/software employed to connect network interface 1048 to bus 1018. While communication connection 1050 is shown for illustrative clarity inside computer 1012, it can also be external to computer 1012. The hardware/software for connection to network interface 1048 can include, for example, internal and external technologies such as modems, including regular telephone grade modems, cable modems and DSL modems, ISDN adapters, and Ethernet cards.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment (UE)," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point (AP)," "base station," "Node B," "evolved Node B (eNode B)," "home Node B (HNB)," "home access point (HAP)," and the like, are utilized interchangeably in the subject application, and refer to a wireless network component or appliance that serves and receives data, control, voice, video, sound, gaming, or substantially any data-stream or signaling-stream to and from a set of subscriber stations or provider enabled devices. Data and signaling streams can include packetized or frame-based flows.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks include Geocast technology; broadcast technologies (e.g., sub-Hz, ELF, VLF, LF, MF, HF, VHF, UHF, SHF, THz broadcasts, etc.); Ethernet; X.25; powerline-type networking (e.g., PowerLine AV Ethernet, etc.); femto-cell technology; Wi-Fi; Worldwide Interoperability for Microwave Access (WiMAX); Enhanced General Packet Radio Service (Enhanced GPRS); Third Generation Partnership Project (3GPP or 3G) Long Term Evolution (LTE); 3GPP Universal Mobile Telecommunications System (UMTS) or 3GPP UMTS; Third Generation Partnership Project 2 (3GPP2) Ultra Mobile Broadband (UMB); High Speed Packet Access (HSPA); High Speed Downlink Packet Access (HSDPA); High Speed Uplink Packet Access (HSUPA); GSM Enhanced Data Rates for GSM Evolution (EDGE) Radio Access Network (RAN) or GERAN; UMTS Terrestrial Radio Access Network (UTRAN); or LTE Advanced.

What has been described above includes examples of systems and methods illustrative of the disclosed subject matter. It is, of course, not possible to describe every combination of components or methodologies here. One of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A device associated with a network operator identity, comprising:
   a processor; and
   a memory that stores executable instructions that, when executed by the processor, facilitate performance of operations, comprising:
      identifying an association between a field device and a service device based on a communication with the field device, wherein the service device is not associated with the network operator identity;
      in response to the identifying the association, determining a service security protocol to enable communication between the field device and the service device via the service security protocol without authentication of the field device via the service device; and
      in response to determining a communication link is successfully established via a network security protocol between the field device and a network device associated with the network operator identity, adapting communication employing a communication path between the field device and the service device to convey data via the service security protocol, wherein the communication path comprises the communication link, wherein the adapting comprises encrypting the data for communication via the communication path to be unreadable by network devices associated with the network operator identity, and wherein the data encrypted for the service security protocol is decryptable by the field device and the service device.

2. The device of claim 1, wherein the field device is authenticated to the network device.

3. The device of claim 2, wherein authentication of the field device to the network device is via the network security protocol.

4. The device of claim 1, wherein the service security protocol is received from a data store remotely located from the network device.

5. The device of claim 1, wherein the service security protocol is updateable via programming input to the service device.

6. The device of claim 1, wherein the service security protocol is updateable via programming input associated with a service operator identity related to the service device.

7. The device of claim 1, wherein the identifying the association is based on service information relating to a public utility provider identity and field device information from a metering device associated with the public utility provider identity.

8. The device of claim 1, wherein communications with the field device comprise a wireless communications link.

9. The device of claim 1, comprised in a femtocell device.

10. The device of claim 1, comprised in an access point device.

11. The device of claim 1, wherein the field device is a mobile computer device.

12. The device of claim 1, wherein the field device is a metering device.

13. The device of claim 1, wherein the field device is a transportation infrastructure device.

14. The device of claim 1, wherein the field device is an energy distribution device.

15. A method, comprising:
   receiving, by a device associated with a network operator identity and comprising a processor, information related to determining an association between a field device and a service device, wherein the service device is not associated with the network operator identity;
   receiving, by the device, protocol data representing a service security protocol, in response to the determining the association, to enable communication between the field device and the service device via the service security protocol without authentication of the field device via the service device;
   establishing, by the device via a network security protocol, a communication link between the field device and a network device associated with the network operator identity; and
   adapting, by the device, transmission of data over a communication path between the field device and the service device to convey the data via the service security protocol, wherein the communication path comprises the communication link, and wherein the adapting comprises encrypting the data for communication via the communication path to be inaccessible by devices other than the field device and the service device.

16. The method of claim 15, wherein the data encrypted to conform to the service security protocol is decryptable by the service device and the field device.

17. The method of claim 15, wherein the receiving the protocol data comprises receiving updated protocol data representing an updated service security protocol associated with an update of the service security protocol via a service provider identity related to the service device.

18. The method of claim 17, wherein the service security protocol is received from a storage device of the device, and wherein security protocols associated with the service provider identity and comprising the service security protocol are stored by the storage device are updateable via a remotely located update device associated with the service provider identity.

19. A non-transitory machine-readable storage medium, comprising executable instructions that, when executed by a processor, facilitate performance of operations, comprising:
   determining an association between a field device and a service device, wherein the service device is not associated with a network operator identity;

establishing a communication link conforming to a first security protocol between the field device and a network device associated with the network operator identity;

in response to establishing the communication, determining a second security protocol, based on the association, to enable communication between the field device and the service device in conformance with the second security protocol without authentication of the field device by the service device; and adapting communication employing a communication path between the field device and the service device to convey data via the second security protocol, wherein the communication path comprises the communication link, wherein the adapting comprises encrypting the data for communication via the communication path to be inaccessible by network devices associated with the network operator identity, and wherein the data encrypted for the second security protocol can be decrypted by the field device and the service device.

20. The non-transitory machine-readable storage medium of claim 19, further comprising, storing, at the network device, security information related to authenticating the field device according to the second security profile.

\* \* \* \* \*